United States Patent [19]

Weimer et al.

[11] 4,296,315
[45] Oct. 20, 1981

[54] CARD READER SECURITY SYSTEM

[75] Inventors: Dan G. Weimer, Scottsdale; Bradford O. Van Ness, Paradise Valley, both of Ariz.

[73] Assignee: Engineered Systems, Inc., Tempe, Ariz.

[21] Appl. No.: 30,308

[22] Filed: Apr. 16, 1979

[51] Int. Cl.³ .......................... G06K 7/08; G06K 7/10; G06K 19/06
[52] U.S. Cl. ..................................... 235/460; 235/450; 235/493
[58] Field of Search ........................ 340/149 A; 360/2; 235/493, 449, 450, 459, 460; 250/555, 569

[56] References Cited

U.S. PATENT DOCUMENTS

| | | | |
|---|---|---|---|
| 3,443,675 | 5/1969 | Yamamoto | 235/493 |
| 3,457,391 | 7/1969 | Yamamoto | 235/493 |
| 3,508,227 | 4/1970 | Berezin | 235/493 |
| 3,731,085 | 5/1973 | Bostrom | 235/493 |
| 3,788,617 | 1/1974 | Barney | 235/493 |
| 3,862,399 | 1/1975 | Cain | 235/493 |
| 4,058,839 | 11/1977 | Darjany | 360/2 |

Primary Examiner—Daryl W. Cook
Attorney, Agent, or Firm—LaValle D. Ptak

[57] ABSTRACT

A punched card reader for use in systems such as bulk fuel terminal dispensing systems, automated unattended bank teller machines and the like includes security provisions to prevent operation of such systems by counterfeit cards. Specifically, the system operates with a punched card made of laminated plastic or the like having a rectangular plate made of magnetic material sandwiched between the card layers. This plate is located in an area of the card adjacent the portion encoded with the variable data uniquely identifying the card and the controlling its function, etc. The card entry throat of the tape reader is modified to have a pair of spaced-apart, magnetically actuated reed switches on one side of the card entry slot. On the opposite side of the card entry slot a pair of corresponding permanent magnets are located. The magnets have a field strength sufficient to operate the magnetic reed switches; so that when no card is inserted into the reader, or when a card not having the magnetic shield in it is inserted into the reader, the reader cannot operate. When a card having the magnetic shield in it is inserted fully into the reading position of the reader, the magnetic shield breaks the magnetic field used to actuate the reed switches, and they change operating state. This state of operation is used in a control circuit, along with the conventional card sensing switch, to enable the reader for operation.

6 Claims, 9 Drawing Figures

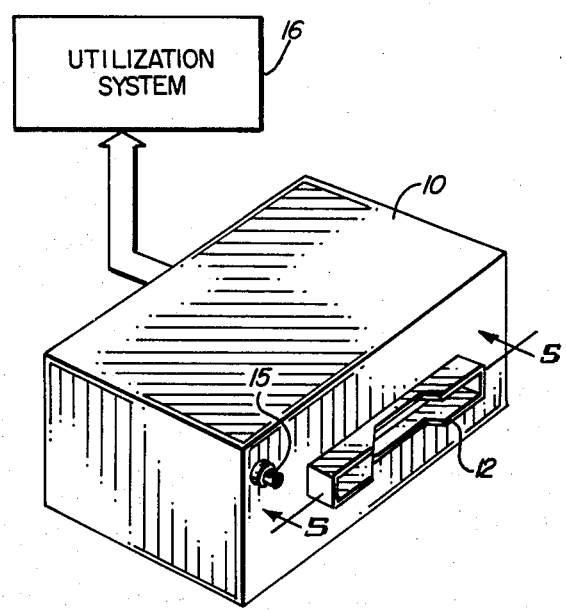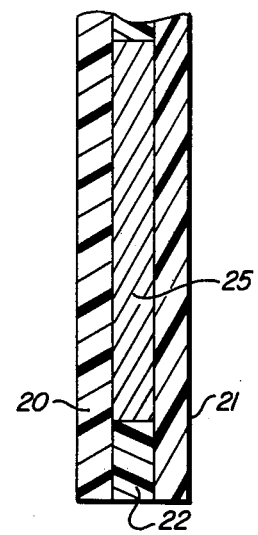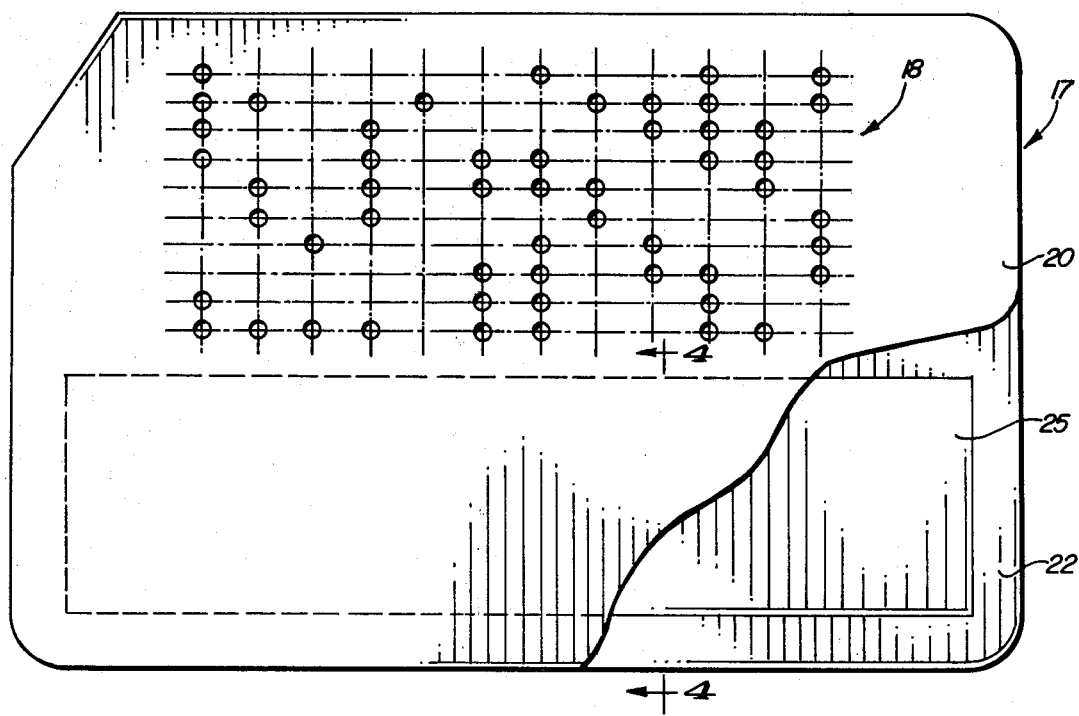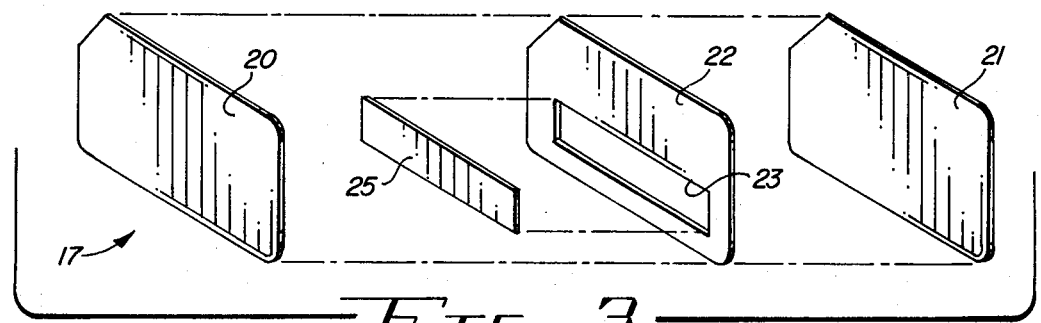

CARD READER SECURITY SYSTEM

BACKGROUND OF THE INVENTION

The advent of low cost microprocessors and microcomputers for use in "intelligent" data terminals and lower costs and improved efficiency of computer systems in general has resulted in an ever increasing number of applications for unattended credit operations, such as automatic computerized bank "tellers", unattended bulk terminal fuel dispensing systems and the like. Such systems usually are operated in response to the entry of an authorized credit card having variable data encoded on it to identify the user, the types of products or extent of credit to which he is entitled, and other variable information required by the particular system with which the card is used. Usually the credit card is inserted into a card reader. Then variable data relative to the specific transaction desired by the user is entered by means of a keyboard or other acutating devices to cause the system to perform the desired operation.

To permit repeated usage of the credit cards or authorization cards in such systems, data is generally encoded in the cards in the form of binary encoded perforations or magnetically encoded information, or the like. A typical card reader is a photoelectric card reader which responds to the passage of light through selectively encoded holes in pre-established positions on the card to initiate and control operation of the system with which such a card reader is used. Mechanical switches also can be employed, and systems have been developed for similarly reading magnetically encoded binary data from laminated plastic credit cards into which permanently magnetized magnets or slugs of magnetic material are placed at the different binary data code positions.

Cards for use in these various readers are typically the same size as the conventional credit cards in widespread use throughout the world today. Since these cards often are used in conjunction with terminals of systems where no attendant is on duty (such as 24 hour automatic bank teller machines, or unattended bulk fuel systems), steps must be taken to prevent counterfeit or unauthorized cards from enabling the system controlled by the card reader for use. In the case of cards which initially have been authorized for use in the system, but where there is a credit problem or some other reason for preventing such a card from operating the system, a card verification system such as the type disclosed in the patent to John Kubina, Patent No. 4,114,140, issued 9/12/78 has been developed. This type of system, however, does not provide protection against the use of a counterfeit card which otherwise has a valid address or user indicia on it, since such a card could pass the verification check provided by the system disclosed in the Kubina patent.

The problem of providing security for punched hole card readers is readily apparent since perforation patterns, properly located, easily can be made in plastic or cardboard cards or card blanks. Such counterfeit patterns may be simply based on the shape and code pattern fields of valid cards produced for use with the system. Counterfeiting is more difficult with laminated cards in which a center lamination has permanent magnets or permanently magnetized material located in different positions to provide the desired binary encoded data. The encoding of data with small permanent magnets, however, is relatively expensive; and the card reader used to decode or read the magnetically encoded data also is of greater complexity and cost than a simple photoelectric or bent wire switch card reader. For this reason, the photoelectric and bent wire switch readers are preferred and are in widespread use.

Therefore it is desirable to provide a relatively inexpensive security system for use with photoelectric or bent wire card readers which permits the reading of authorized cards in a system but which prevents the card reader for being enabled when a counterfeit or unauthorized card is inserted into the reader. Such a security system should be one which is concealed, both in the reader and in the card, and which makes the counterfeiting of cards difficult to accomplish without specialized manufacturing equipment.

SUMMARY OF THE INVENTION

Accordingly it is an object of this invention to provide an improved security system for a card reader.

It is an additional object of this invention to provide an improved security system for a card reader for reading data encoded on cards having a magnetic shield area located in the card for cooperation with a magnetically actuated security switch.

It is another object of the invention to provide an improved security system for a card reader which prevents operation of the card reader when counterfeit or unauthorized cards are inserted into the reader.

It is a further object of this invention to provide an improved security system for a card reader which is simple to implement and effective in operation.

In accordance with a preferred embodiment of the invention a security system for a card reader, which may be a photoelectric reader, a bent wire reader, or a reader for cards having magnetically encoded data on them, operates in conjunction with cards having a specified magnetic shield area located in them. The card entry throat of the card reader has a slot for accommodating the cards inserted into the reader. At least one magnetically actuated switch is located on one side of the slot in the card entry throat and at least one permanent magnet is located opposite the switch on the other side of the slot. The field strength of the permanent magnet is sufficient to operate the switch. When an authorized card for use in the system is inserted into the reading position through the slot in the card entry throat, the magnetic shield area of the card breaks the operating field between the permanent magnet and the magnetically actuated switch to result in a change of state of operation of the switch. An electrical control circuit is connected with the switch and is operated in response to the change of state of the switch for controlling the reading of data encoded on cards inserted into the card reader. If an unauthorized card is inserted into the slot in the reader, no change in state of the magnetically operated switch occurs, and the control circuit prevents the reading of the data encoded on such an unauthorized card.

BRIEF DESCRIPTION OF THE DRAWINGS

FIG. 1 is a diagramatic view of a typical card reader for use with the system.

FIG. 2 is a partially cut-away view of a card for use with the reader of FIG. 1;

FIG. 3 is an exploded view of a card of the type shown in FIG. 2;

FIG. 4 is a cross-sectional view of a portion of the card shown in FIG. 2;

DETAILED DESCRIPTION

Figure 5:
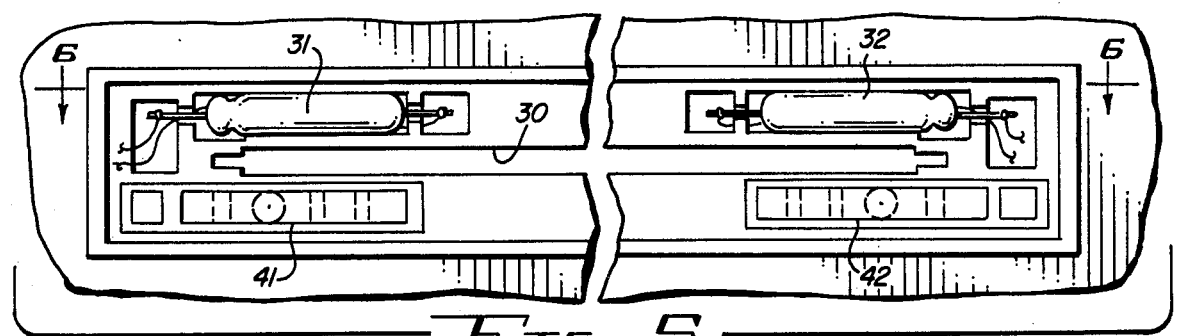
FIG. 5 is a rear view taken along the lines 5—5 of the card entry throat of the reader shown in FIG. 4.

Reference now should be made to the drawings, where the same reference numbers are used throughout the several figures to designate the same or similar components. FIG. 1 is a diagramatic representation of a typical card reader 10 of the type which may be used in conjunction with the security system of the preferred embodiment of this invention. The card reader 10 may be one of a number of different commerically available card readers, such as the Panasonic model #ZU120 HR-3Z photoelectric punched card reader. This card reader has a card entry throat 11 which is constructed to aid the user in guiding the insertion of a card into the reader. The Panasonic model #ZU120 HR-3Z reader uses friction springs to hold an inserted card into place, and the card is simply inserted by the user into the reader as far as it will go. The throat 11 has a generally recessed central portion 12 into which the edge of a fully inserted card extends, so that the card readily may be grasped by the user for removal from the reader after it has been read. An indicator light 15 is located on the front panel of the reader 10 to indicate to the user the reading status of an inserted card. Typically the light 15 turns on when an authorized card is accepted for reading by the reader and remains on until the reader has completed the reading of the card and the transfer of the data on it to a suitable utilization system 16. Typically the system 16 may be a bulk fuel terminal control system, or the like, of the type disclosed in the above mentioned Kubina patent.

The data reading portion of the card reader shown in FIG. 1 is a conventional photoelectric reader and no modification to that portion of the reader is made. Consequently, no description of the operation of the reader or its interface with the utilization 16 is considered necessary here. The reader of FIG. 1, however, has been modified to provide a level of security against the use of counterfeit or unauthorized cards. If a counterfeit card, which otherwise has all of the proper dimensions, and even has properly encoded data on it, is inserted into the reader 10, the reader 10 is prevented from operating by the security system; so that no use may be made of the utilization system 16 in response to the insertion of such an unauthorized card into the throat 11 of the reader 10.

To implement the security features incorporated into the reader 10, a data card 17 of the type shown in FIGS. 2, 3 and 4 is used. Typical dimensions for such a card are approximately 3.25 inches by 2.12 inches. This is a standard credit card dimension widely used for many credit card applications today. The card 17 has a ten column by twelve row data field 18 on it which is variably encoded with the binary data necessary to identify the card user, transaction authorizations, etc. for the particular application with which the card is used. The card 17 has this data field 18 located on the upper half, as shown in FIG. 2; and the binary data is encoded by selectively punching or otherwise forming holes at the various data locations in the columns and rows shown. These holes then permit use of the card 18 in the photoelectric reader 10 in a conventional manner.

The card 17 is formed of a three layer lamination, typically made of a suitable heat setting plastic or similar material. The two outer laminated layers 20 and 21 (FIG. 3) in an actual commercial embodiment are 0.015 inches thick and the central layer 22 is 0.010 inches thick. The layer 22 has a rectangular cut-out 23 formed in it, as shown most clearly in FIGS. 2 and 3; and a magnetic shield insert 25 made of mumetal or other suitable material is placed in the cut-out 23. The insert 25 is the same thickness as the thickness of the layer 22.

After insertion of the magnetic shield 25 into the cut-out 23, the card 17 is assembled by laminating together the layers 20, 21 and 22 to form a composite sandwich, illustrated most clearly in FIG. 4. As is apparent from an examination of FIGS. 2 and 3, the magnetic shield 25 is located in an area substantially encompassing the lower half of the card. This is the protion of the card which is at the outside edge of the throat 11 when the card 17 is inserted into the reader 10.

It also is apparent from an examination of the structure shown in FIGS. 2, 3 and 4, that the presence of the magnetic insert 25 cannot be detected by an examination of the fully assembled laminated card. Since the magnetic shield insert 25 is located outside of the data field portion 18 of the card, the punching or forming of the holes in the data field 18 may be done in the normal manner with conventional equipment.

Figure 6:
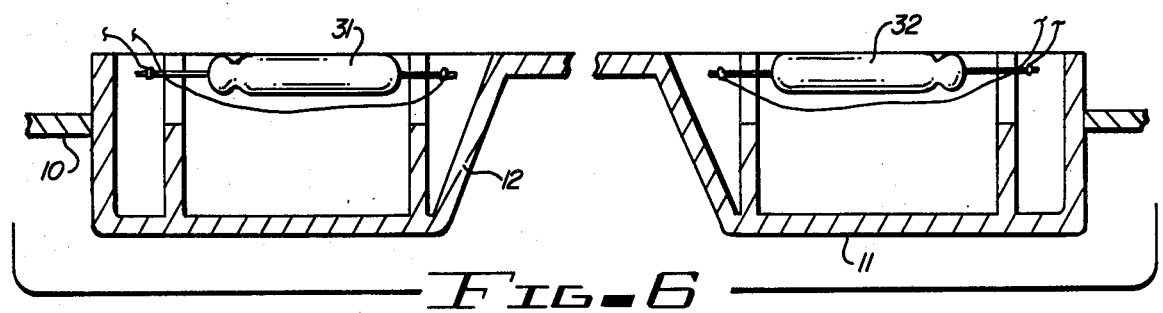
FIG. 6 is a cut-away view taken along the lines 6—6 of FIG. 5.

FIGS. 5, 6, 7 and 9 show details of the modifications made to the throat 11 of the card reader 10 to add a security detection arrangement to the reader 10 for use with cards having the structure shown in FIGS. 2, 3 and 4. FIG. 5 shows the rear portion of the throat 11 taken along a section line 5—5 of FIG. 1. FIG. 6 shows the orientation of the throat 11 with respect to the front panel of the reader 10 and provides additional details of the specific location and arrangement of the parts of the security detection apparatus. The throat 11 includes the conventional card entry slot 30, into which the cards 17 are inserted. Immediately above this slot, in recesses formed in the rearward portion of the throat 11, are a pair of magnetically actuated reed switches 31 and 32. Similarly located in recesses directly opposite the switches 31 and 32, and on the opposite side of the card entry slot 30, are a corresponding pair of rectangular bar magnets 41 and 42. The throat 11 is made of plastic material or other non-magnetic material, so that the magnetic field of the magnets 41 and 42 acts upon the reed switches 31 and 32 to close the contacts of those switches. The strength of the magnetic fields of the magnets 41 and 42 is selected to be such that it normally closes the switches 31 and 32 when no card is inserted into the reader 10 or when no card having the magnetic shield area 25 properly located in it is placed in the reader. The switches 31 and 32 and the permanent magnets 41 and 42 may be secured in place at the rear of the throat member 11 by means of silicon rubber compound, epoxy, or other suitable cementing materials.

Figure 7:
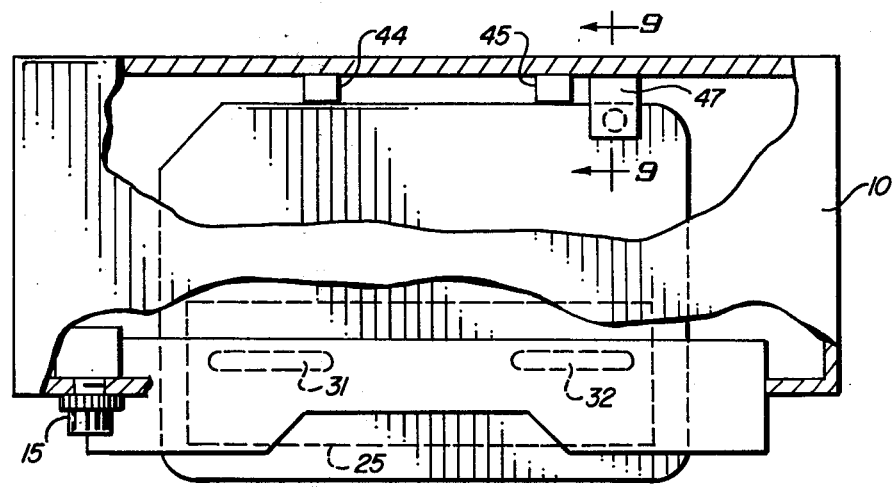
FIG. 7 is a diagramatic representation of the reader with a card inserted into it in the reading position.
Figure 9:
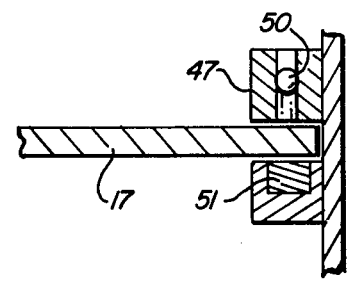
FIG. 9 is a partially cut-away cross-sectional view taken along the lines 9—9 of FIG. 7.

Reference now should be made to FIG. 7, which illustrates the essential details of the card reader 10, modified as described above for use with cards of the type shown in FIGS. 2, 3 and 4. A pair of card positioning abutments 44 and 45 are located at the rear of the reading zone of the reader to determine the rearmost point of travel of the card 30 when it is inserted into the reader. Detection of the presence of a card in the reader is accomplished by a photoelectric switch 47 which functions as a normally closed switch in the absence of a fully inserted card. The details of this switch are shown in FIG. 9 with a card inserted into the reading position. The switch comprises a suitable light source 50 and a photoelectric sensor 51 on opposite sides of the card guide slot. When a card 17 is fully inserted into the reader, the light path between the light source 50 and the photoelectric sensor 51 is broken; so that the switch 47 then reverts from a normally closed switch state to an open switch state.

As can be seen most clearly in FIG. 7, when a card 17 is fully inserted into the reader 10 in the reading position, the magnetic shield 25, laminated into the center layer of the card 17, is positioned between the reed switches 31 and 32 and their corresponding oppositely located operating magnets 41 and 42. The shield 25 cuts off the magnetic field of the permanent magnets 41 and 42 from reaching the switches 31 and 32. As a consequence they switch from their normal or stable closed circuit condition to an open circuit condition. If no shield 25 is present in a card inserted into the reader, the state of the switches 31 and 32 does not change, and they remain closed irrespective of the state of the operation of the photoelectric switch 47.

Figure 8:
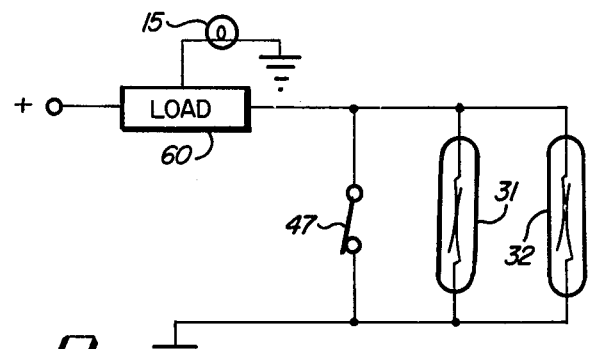
FIG. 8 is a partial schematic diagram showing the control circuit wiring connections of the switches shown in FIGS. 5, 6 and 7.

In a card reader of the type shown in FIG. 1, the reader is not actuated for operation in conjunction with the utilization system 16 until a card is fully inserted into the system. When this occurs, the switch 47 changes state from a normally closed state to an open state to turn on or enable a control circuit shown as a "load" 60 in FIG. 8. The load circuit 60 in turn controls the operation of the indicator lamp 15 and the balance of the utilization system 16 in a conventional fashion. The reed switches 31 and 32 are connected in parallel across the conventional card sensing switch 47; so that it is necessary for all three switches 31, 32 and 47 to be open before the load circuit 60 responds to permit operation of the reader, the lamp 15, and the utilization system 16 (FIG. 1). So long as any one of the switches 31, 32 or 47 remains in its normally closed position or state, the load circuit 60 is not enabled for operation.

Thus, if a card 17 is not fully inserted into the reading position, so that the switch 47 remains closed, the load circuit is not energized even though the magnetic field 25 of an authorized card breaks the magnetic fields of the magnets 41 and 42 to cause the switches 31 and 32 to revert from their normally closed state to an open state. Similarly if a counterfeit or unauthorized card is fully inserted the reader so that the switch 47 is opened, but the switches 31 and 32 (or either one of them) remain closed, the load 60 is not enabled for operation. Obviously, if a card were inserted into the system which had a magnetic field operating on only one of the reed switches 31 or 32, the load 60 also would not be enabled for operation. It is necessary for a valid or authorized card to be fully inserted into the reader, as shown in FIG. 7, to open all three switches 31, 32 and 47 before the load 60 is enabled for operation of the reader and the remainder of the utilization system 16 associated with it.

From the foregoing, it can be seen that relatively simple modification of an otherwise conventional card reader for use with an easy to manufacture laminated data card results in a highly effective security system for use in the card reader. Various modifications will occur to those skilled in the art, such as utilizing normally open switches 31, 32 and 47 or different connections of these switches (including series connections) to achieve the same results of the embodiment which has been described above. Therefore that embodiment should be considered as illustrative only of the invention, and it is not intended to be restrictive of the true scope of the invention.

We claim:

1. A security system for a card reader for reading data encoded on cards having a magnetic shield area located on the cards and covering at least two spaced points therein, said security system including in combination;

a card entry throat in the card reader having a slot therein to accommodate cards to be inserted into the reader;

two spaced-apart magnetically actuated switch means located on one side of the slot in said card entry throat;

two corresponding spaced-apart permanent magnet means located on the other side of the slot in said card entry throat opposite different ones of said two spaced-apart magnetically actuated switch means respectively, each of said magnet means having a field of sufficient strength to operate the corresponding switch means located opposite such magnet means, the relative locations of said switch means and said permanent magnet means being such that the shield area of an inserted card breaks the field from the permanent magnet means operating on the corresponding one of said switch means;

card insertion sensing switch means operated from a first state of operation to a second state of operation only when a card is fully inserted into the card reader for reading thereby; and electrical control circuit means connected with each of said two spaced-apart magnetically actuated switch means and said card insertion switch means and operated thereby only when a card having a magnetic shield area covering said at least two spaced points thereon in the proper area thereof is fully inserted into the card reader for reading thereby.

2. The combination according to claim 1 wherein said card insertion switch means and said two magnetically actuated switch means are connected in parallel with one another to said electrical control circuit means to cause said electrical control circuit means to be operated to permit reading of a card inserted into the card reader only when the magnetic field for operating both of said switch means is interrupted to change the state of operation of both of said switch means from a first state, when no card is inserted into the reader, to a second state when a card having a properly located magnetic shield area in it is fully inserted into the reader in the reading position as sensed by said card insertion switch means.

3. The combination according to claim 1 wherein the cards for use with the system have a rectangularly shaped magnetic shield in them extending across the width of the card in a direction parallel to the slot in said card entry throat; and wherein the data encoded on the card is encoded on the remainder of the card in an area not occupied by the magnetic shield; and said magnetically actuated switch means and said permanent magnet means are located on opposite sides of the slot in said card entry throat; so that when a card is fully inserted into the reading position in the card reader, the magnetic shield is between said switch means and said permanet magnet means to interrupt the operating magnetic field normally applied to said switch means by said permanent magnet means when no shield is interposed between them.

4. The combination according to claim 3 wherein the card reader further includes positioning means for properly positioning a card inserted into the reader to be read thereby, said positioning means functioning to locate the magnetic shield of a card in said position to interrupt the operating magnetic field normally applied to said switch means by said permanent magnet means.

5. The combination according to claim 4 wherein said switch means and said permanent magnet means are located near the entry side of said card entry throat and wherein the shield area of an inserted card is located between said switch means and said permanent magnet means, with the remainder of the card on which data is encoded being located between said positioning means and said throat means for reading by the card reader.

6. The combination according to claim 5 further including card sensing switch means in said electrical control circuit means and connected with said magnetically actuated switch means to permit reading of a card by the card reader only when a card having said rectangularly shaped magnetic shield in the proper area thereof is fully inserted into the card reader for reading thereby.

* * * * *

UNITED STATES PATENT AND TRADEMARK OFFICE
CERTIFICATE OF CORRECTION

PATENT NO. : 4,296,315
DATED : October 20, 1981
INVENTOR(S) : Dan G. Weimer and Bradford O. Van Ness It is certified that error appears in the above–identified patent and that said Letters Patent are hereby corrected as shown below:

Column 8 - Cancel Claim 6.

On the Title page, "6 claims" should read -- 5 claims --.

Signed and Sealed this

Twenty-ninth Day of December 1981

[SEAL]

Attest:

GERALD J. MOSSINGHOFF

Attesting Officer

Commissioner of Patents and Trademarks